May 18, 1943 G. L. LARISON Re. 22,316

SHOCK REDUCING AND CUSHIONING WHEEL MOUNTING FOR VEHICLES

Original Filed March 27, 1939 5 Sheets-Sheet 1

Inventor
Glenn L. Larison
By T. J. Geisler
and R. H. Geisler
Attorneys

May 18, 1943 G. L. LARISON Re. 22,316

SHOCK REDUCING AND CUSHIONING WHEEL MOUNTING FOR VEHICLES

Original Filed March 27, 1939 5 Sheets-Sheet 2

Inventor
Glenn L. Larison
By T. J. Geisler and F. H. Geisler
Attorneys

SHOCK REDUCING AND CUSHIONING WHEEL MOUNTING FOR VEHICLES

Original Filed March 27, 1939 5 Sheets-Sheet 3

Inventor
Glenn L. Larison
By T. J. Geisler
and H. Geisler
Attorneys

May 18, 1943 G. L. LARISON Re. 22,316

SHOCK REDUCING AND CUSHIONING WHEEL MOUNTING FOR VEHICLES

Original Filed March 27, 1939 5 Sheets-Sheet 4

Inventor
Glenn L. Larison
By T. J. Geisler
and A. L. Geisler
Attorneys

May 18, 1943 G. L. LARISON Re. 22,316

SHOCK REDUCING AND CUSHIONING WHEEL MOUNTING FOR VEHICLES

Original Filed March 27, 1939 5 Sheets-Sheet 5

Inventor
Glenn L. Larison
By T. J. Geisler
and H. Geisler
Attorneys

Reissued May 18, 1943

Re. 22,316

UNITED STATES PATENT OFFICE 22,316

SHOCK REDUCING AND CUSHIONING WHEEL MOUNTING FOR VEHICLES

Glenn L. Larison, La Grande, Oreg., assignor to Larison Compensating Axle Corporation, a corporation of Oregon Original No. 2,170,454, dated August 22, 1939, Serial No. 264,361, March 27, 1939. Reissue No. 21,483, dated June 18, 1940, Serial No. 332,416, April 29, 1940. This application for reissue July 7, 1941, Serial No. 401,404

15 Claims. (Cl. 280—81)

This application is a continuation in part taken from my co-pending application, Serial No. 223,-275, filed under date of August 5, 1938, Patent No. 2,199,409, May 7, 1940.

This invention relates to vehicles of various types, but, more particularly, to trucks and trailers of the heavy duty type in which multiple wheels are necessary for properly carrying the load.

In vehicles of this character it is customary to provide a plurality of wheels in pairs in order to obtain greater load-carrying efficiency. In this invention I also use wheels in pairs and mount each wheel separately, to permit each wheel to roll independently and to be raised above the other wheels, and so as to cause each wheel to carry its share of the load at all times regardless of the irregularities in the surface of the roadway.

I have discovered, however, that a mere equalizing or shock-reducing connection between the wheel spindles of each pair of wheels—thus effecting a compensating mounting in which the spindles move in unison—is not sufficient because such construction, no matter how arranged, does not prevent severe thrusts or shocks to the wheel-mounting assembly when the vehicle travels at slow speed over a rough road or at high speeds on a modern, improved highway. At high speeds the impact of the vehicle wheels against relatively low irregularities in the road surface produces, nevertheless, a very severe shock on the wheel mounting assembly. These severe thrusts and shocks so impartd to the vehicle and its wheel mounting are not only hard on the vehicle and its load, but also produce physical strain on the driver of the vehicle. Furthermore, when vehicles are driven over modern highways at high speeds, particularly trucks operating with heavy chains mounted on the wheels, the shocks or pounding action on the highway surface occasioned by impacts of the spaced chain lengths with the road surface, cause wear and strain to the road surface. Tests have shown, however, that this wear and strain on the road bed is materially lessened when the vehicle is equipped with means for properly cushioning such shocks.

While an equalizing or compensating connection between each pair of wheels in the vehicle, such as mentioned above, will reduce the thrusts and shocks imparted to the wheel mounting and to the vehicle and its load, this connection does not adequately reduce the shocks to make such mounting in itself sufficiently practical for vehicles under all conditions, but requires the providing of additional means by which these shocks are reduced to a more substantial degree or cushioned.

The object of this invention, accordingly, is to provide a resilient or cushionng connection between the wheel-spindles of each pair, which, while permitting each wheel spindle to move up or down with respect to the other wheel spindles, will also insure the cushioning of sudden violent upward thrusts on any one spindle, instead of instantly transmitting the entire force of such thrusts and shocks to the oppositely connected spindle.

A further object of this invention is to provide such a connection between the spindles of each pair that, under certain conditions, both spindles may move upward suddenly together, without necessitating any immediate lifting of that portion of the vehicle support to which the spindle assemblies are hinged, as, for example, when both wheels of a pair suddenly are caused to engage a bump or obstruction in the roadway, and, under such conditions, thus causing an entirely different action by the connected spindles from that obtained with the usual equalizing or so-called compensating connection between the pair of spindle assemblies.

The manner in which these objects are obtainable is hereinafter fully described with reference to the accompanying drawings illustrating practical embodiments of my invention.

Figure 1:
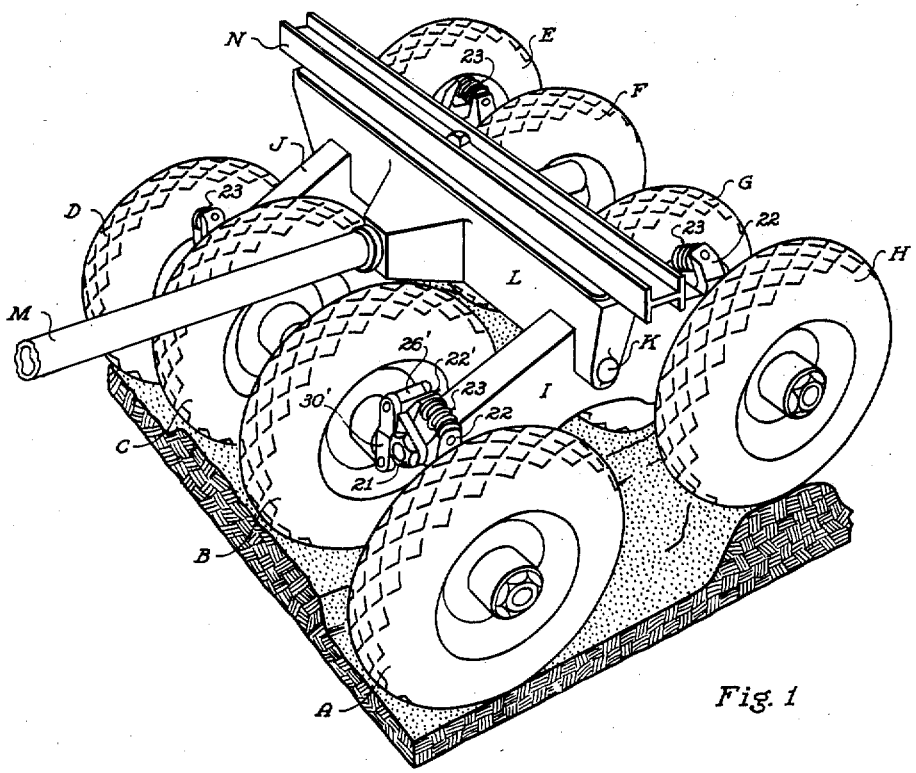
Fig. 1 is a perspective view of a heavy duty trailer supported on eight wheels and embodying the principles of my invention, the wheels being shown raised to different heights as might occur when the vehicle is traversing an extremely uneven road surface.

In the heavy-duty vehicle shown in Fig. 1, the eight rubber-tired wheels A, B, C, D, E, F, G, and H are arranged in two transverse rows of four each. Each wheel is permitted independent vertical movement in accordance with the principles of my invention and the vehicle is at all times evenly distributed among the eight wheels. The wheels A and B are mounted on spindle carrying assemblies independently hinged to the forward end of a longitudinal member I and the wheels G and H are mounted in like manner at the rear end of the longitudinal member I. Similarly, the wheels C and D and the wheels E and F are mounted at the forward and rear ends respectively, of the companion longitudinal member J. The longitudinal members or "walking beams" I and J are pivotally connected as shown at K, to the transverse bolster L, which, in this particular trailer type of vehicle, constitutes the vehicle frame and is provided with the usual draw bar M and superimposed bunk N. The pivotal connections of the longitudinal members I and J to the bolster L permit these members to oscillate in vertical planes parallel to the direction of travel of the vehicle when the wheels traverse uneven road surfaces.

As previously indicated, the wheel-carrying assemblies in my invention are arranged in pairs. Thus, four pairs of these assemblies are required for the eight-wheeled trailer of Fig. 1, but since these four pairs are identical, only one pair need be described. For this purpose the assemblies for the wheels A and B will be described in detail with reference to Figs. 3, 4, 5, 6 and 7.

The wheels A and B are rotatably mounted on the spindles 11 and 11', respectively, in abutment with the fixed collars 12 and 12'. The spindle 11 is formed integral with, or rigidly secured to, an arm 14, and the spindle 11' is likewise formed on, or secured to, a similar arm 14', the spindles extending from opposite sides of and perpendicular to the vertical plane of the longitudinal member I, substantially as shown in the sectional plan Fig. 7. The inner ends of the arms 14 and 14' are bifurcated to form hinge portions 15 and 15' which register with similar bifurcations of a hinge fixture 16, made fast to the longitudinal member I, in such manner that the hinged arms 14 and 14' may swing independently in vertical arcs about the common hinge pin 17, the hinge pin 17 being perpendicular to the vertical plane of the longitudinal member I. The hinge fixture 16 is set in a suitable recess at the bottom of the walking beam I to permit limited upward movement of the spindle-arms 14 and 14' as shown in longitudinal section in Fig. 6. The limit of such upward pivotal movement of the spindle-arms 14 and 14' may be definitely established by the provision of a stop plate 18, of the required thickness, firmly attached to the walking beam I. These hinged spindle-arms with their hinge connection to the longitudinal beam permit upward and downward movement of the wheel-spindles without any sidewise or lateral movement with respect to the beam I and allow independent movement of the vehicle wheels in planes always parallel to the substantially vertical plane of the walking beam or longitudinal chassis member.

A stub shaft 20 (Fig. 6) is firmly secured in the end of the beam I, near the top, with its axis substantially horizontal and parallel to the major axis of the beam I. On this shaft 20 the rocker arms 19 and 19' are mounted for free and independent rotation, and these are held against axial displacement on said shaft by a nut 21.

Figure 3:
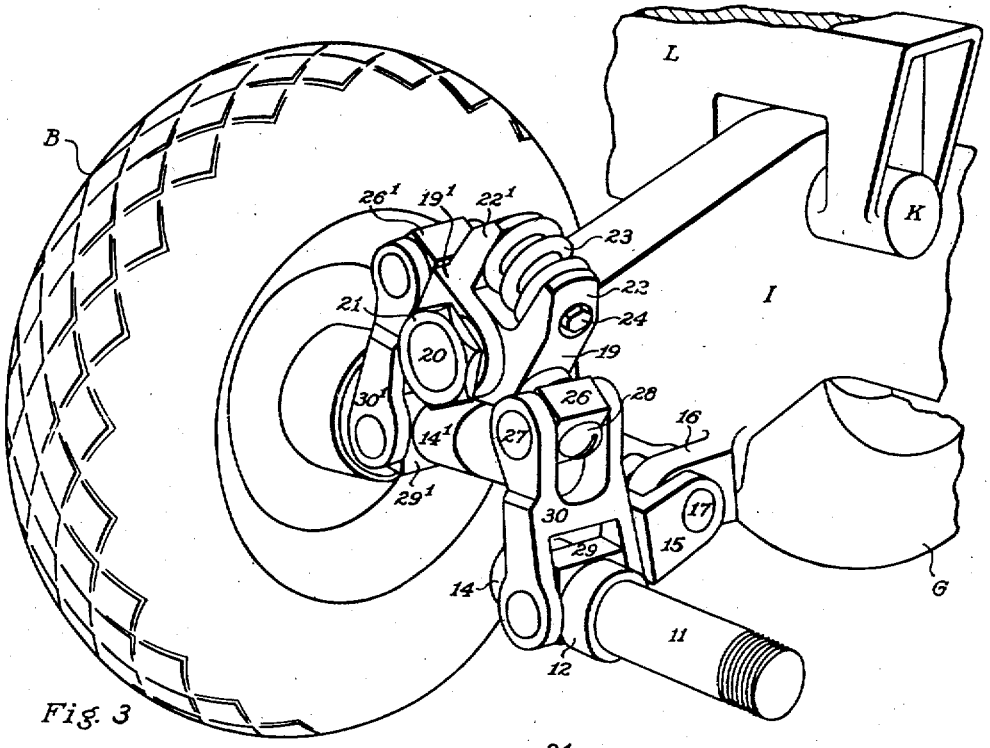
Fig. 3 is an enlarged perspective view of the resilient mountings of one pair of wheels of the vehicle illustrated in Fig. 1, one of the wheels of this pair having been removed to show more clearly construction and action of the wheel spindle assemblies.
Figure 7:
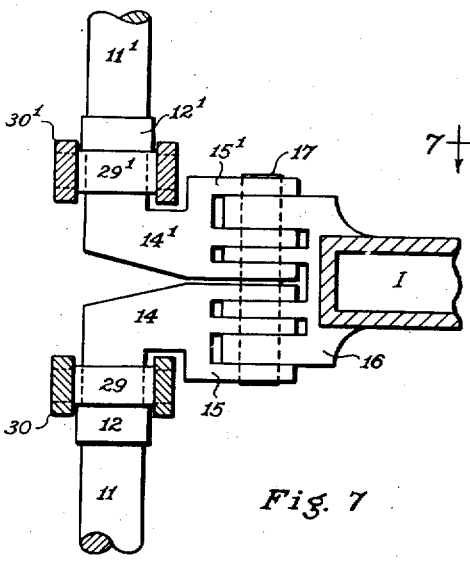
Fig. 7 is a sectional plan taken on line 7—7 of Fig. 6.
Figure 6:
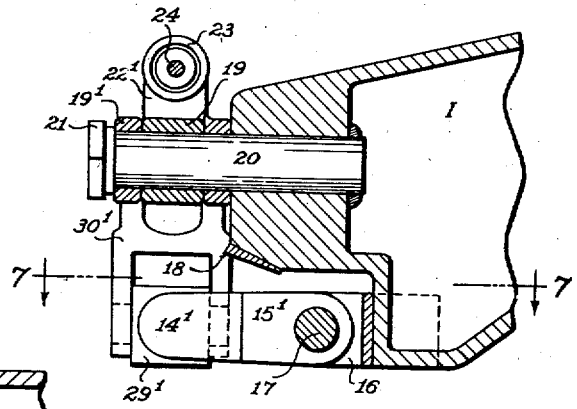
Fig. 6 is a fragmentary medial sectional elevation corresponding to the line 6—6 of Fig. 4.

The hub of the rocker 19 occupies the central position of the extending part of the shaft 20, and the hub of the rocker 19' is bifurcated to straddle the hub of the rocker 19 as seen in Figures 3 and 6. An upstanding lug or shoulder 22 is formed integral with the rocker 19, and a similar shoulder 22' is provided on the rocker 19', these shoulders being spaced apart to bear on a substantial compression spring 23 interposed between their inner faces in such manner as to afford a resilient resistance to the upward arcuate movement of either or both rockers. A bolt 24, loosely disposed in the shoulders 22 and 22' and passing through the spring 23, together with suitable keeper washers (not shown) at the ends of the spring, retain the spring against lateral displacement and limit the movement of the rockers and the upstanding lugs away from each other.

Figure 4:
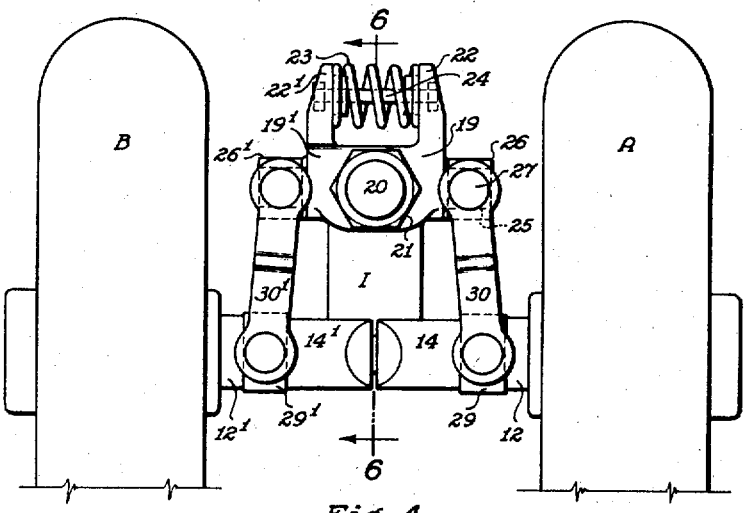
Figs. 4 and 5 are end elevations of the same pair of wheels and wheel spindle assemblies, Fig. 4 showing the wheels at the same height and Fig. 5 illustrating the shock-cushioning action which takes place when one of the wheels is suddenly raised above the other as occurs when one wheel is forced to pass over a bump on the road surface.
Figure 5:
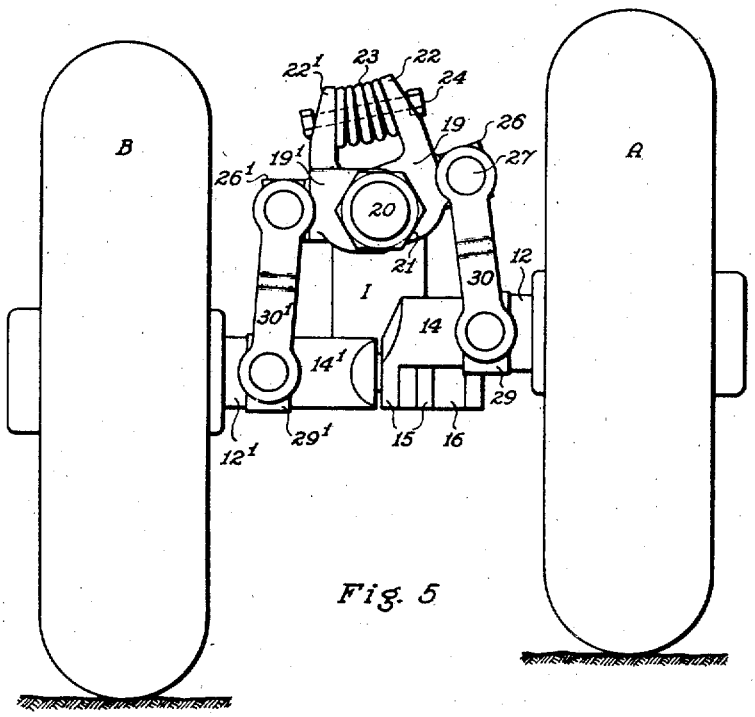

The rocker 19 has an integral stub shaft 25 (see dotted lines in Fig. 4) extending radially from the hub and substantially at right angles to the shoulder 22. A pivot block 26 is journaled on this stub shaft 25. The block 26 has fixed short pins 27 extending from opposite sides, and the block 26 is held against axial movement on the stub shaft 25 by a screw 28 (Fig. 3) threaded into the end of the shaft 25. The spindle 11 carries a similar pivot block 29 adjacent the fixed collar 12. Connecting the pivot block 29 of the spindle 11 and the pivot block 26 on the rocker 19 is a link 30 having forked ends which are disposed on the pins of the pivot blocks and which may oscillate with respect thereto, as shown in Figures 3, 4 and 5. The rocker 19' is coupled to the spindle 11' by similar means comprising pivot block 26', link 30' and pivot block 29'.

The action of each pair of wheel-carrying assemblies will now be explained with particular reference to Figures 3, 4 and 5. When the wheels A and B are resting on, or traversing a smooth and level road surface, the wheel spindles will be held in the relative position illustrated in Fig. 4, because the shock-cushioning spring 23 is made sufficiently strong to support that portion of the vehicle load borne by the corresponding end of the walking beam I. However, when one of the wheels, for example the wheel A, encounters a bump on the road surface, it will be raised to a greater elevation than the wheel B. In such case, the spindle arm 14 will be lifted in a vertical arc about the hinge beam 17, the link 30 will be thrust upwardly, and the rocker 19 will be rotated counterclockwise as viewed in Figures 4 and 5.

Under some conditions this movement of the rocker 19, due to the load-supporting strength of the interposed spring 23, will cause similar movement to be imparted to the rocker 19', resulting in a downward thrust on link 30' corresponding to the upward thrust on link 30 with consequent raising of the end of the walking beam I one half of the distance that the wheel A is lifted. However, if the raising of the wheel A occurs suddenly, the inertia of the load will cause compression of the spring 23, and if the vehicle is loaded to the sustaining capacity of the spring as heretofore mentioned, the sudden shock will be entirely taken up by the compression of the spring 23, the wheels, wheel-carrying assemblies, and beam I then assuming the relative positions shown in Fig. 5. Thus the upward thrust of the wheel A is cushioned by the spring 23 after the manner of a shock-absorber. Were both wheels to strike a sudden bump in the road and be simultaneously raised, the spring would be compressed from both ends by the inward motion of the rockers with like shock-absorbing action.

The plane of rotation of the wheel A is not changed by the upward thrust of the uneven road surface as in some other devices, but is confined by the hinged spindle-arm 14 to the normal plane of rotation, that is, parallel to the beam I, and at a constant distance therefrom. No tilting of either wheel nor consequent sidewise slipping of the tires occurs.

The stop plates 18 (see Fig. 6) definitely establish the extent of upward travel of the spindle arms 14 and 14' and also the downward movement of the beam I with respect to the supporting wheels. In the event of fracture or complete failure of one of the wheels or its spindle the end of the walking beam I can drop only until the stop plate 18 abuts the spindle-arm of the other wheel of the pair. The other wheel then carries a double load, but there is no tendency of the vehicle to change its course or to leave the road under such conditions. The stops 18 may be so arranged that the distance which the beam I is permitted to drop will be less than the effective depth of the pneumatic tires on the wheels of the vehicle, so that in case of complete loss of air in one tire the action previously described will take place and the load on that wheel will be shifted to the companion wheel, the defective tire thus being relieved of its share of the load and the rim of the wheel being prevented from resting on it. Figure 3 illustrates the end of the beam I supported on one wheel, the other wheel having been removed from its spindle.

Figure 8:
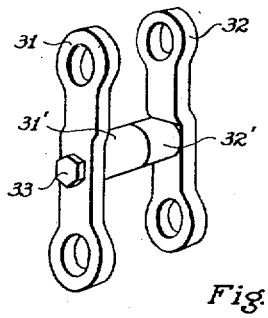
Fig. 8 is a perspective view of a modified form of one of the parts of the spindle assembly.

In Figures 3, 4, 5 and 6 as shown, the links 30 and 30' are each formed of a single piece of material. Figure 8 illustrates a modified form of link made in two parts 31 and 32 having central inwardly extending bosses or spacers 31' and 32' and the two parts coupled together by a bolt 33 or other suitable means. Actually I have found it more practical to use links constructed in this manner than the links shown in Figs. 3, 4, 5 and 6. However, various other ways in which such links might be constructed in order to function in the manner intended will suggest themselves.

Figure 2:
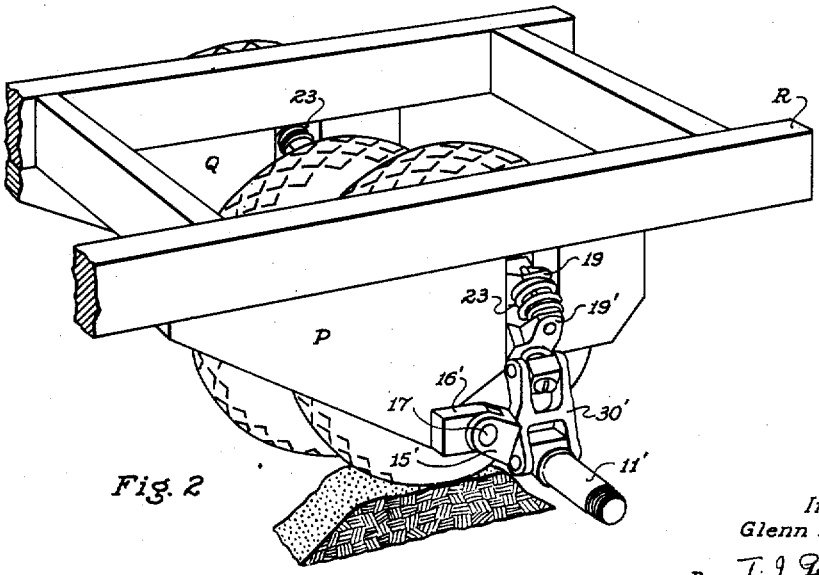
Fig. 2 is a perspective view of the rear portion of a vehicle chassis supported on four wheels and also embodying the principles of my invention, one of these wheels having been removed to reveal the spindle-carrying mechanism and two of the remaining wheels raised to different heights as in Fig. 1.

In the vehicle shown in part in Fig. 2, there are no walking beams. The longitudinal members P and Q are in this instance made rigid with the vehicle frame R, and a hinge fixture 15' is firmly secured at the bottom of each longitudinal member as before. A fixed shaft (not shown, but being similar to the shaft 20 of Figures 3 and 6), carries the rockers 19 and 19' of each pair of wheel-carrying assemblies, such shaft being firmly secured in each of the members P and Q. In all other respects, the wheel-carrying assemblies are the same.

Figure 9:
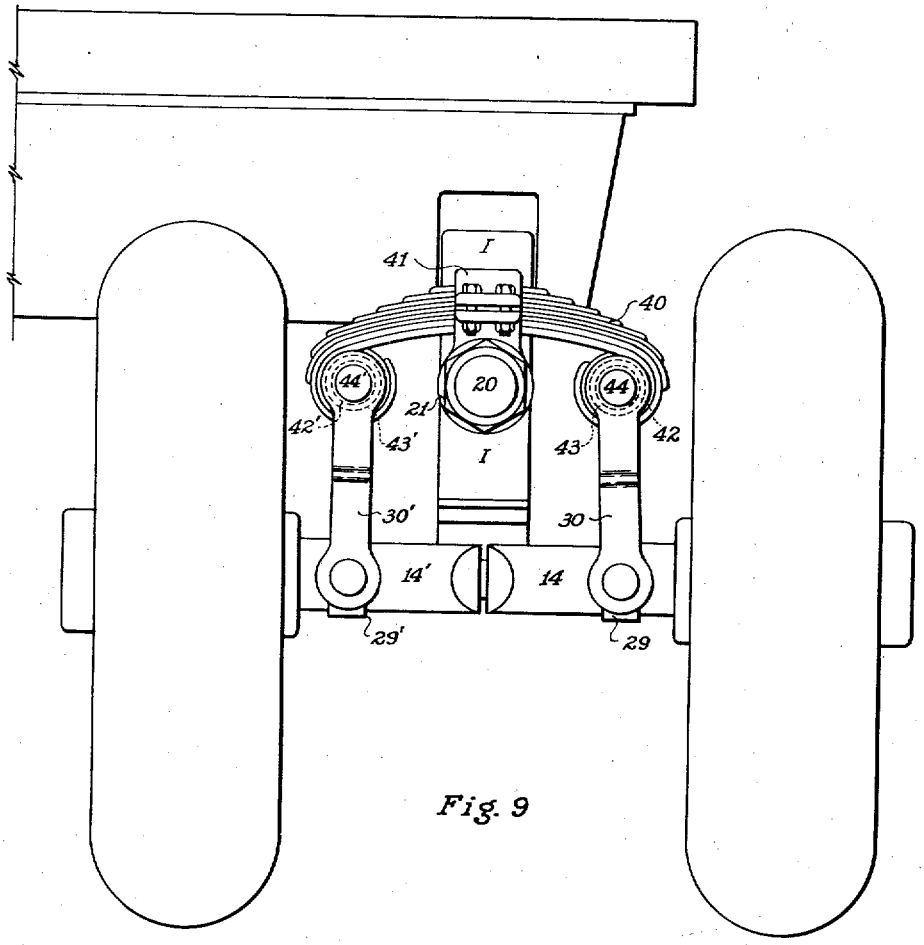
Fig. 9 is an end elevation similar to Fig. 4 but showing the companion wheel spindle assemblies connected by a compound resilient member and the construction modified in certain other respects to conform with the principles of my invention.

Figure 9 shows a modified form in which my invention may be constructed. Here the shock-absorbing function of the shouldered rockers and interposed compression spring of the previously described embodiment is performed by a single member, namely the leaf spring 40. This flexible member is formed of a number of leaves of the proper length and thickness to support a normal vehicle load and these leaves are clamped together at the middle in a cradle 41 which is rockably mounted on the stub shaft 20 of the walking beam I. The lower-most leaves of the spring 40 are bent at the ends to form eyes, and into these eyes are placed bushings 42 and 42' (shown dotted), these bushings being formed with concave seats to receive balls 43 and 43' (shown dotted) which have cylindrical projections 44 and 44' extending therefrom in substantially axial alignment with the spring eyes. These shaft-like projections are disposed in the upper ends of the links 30 and 30' and constitute knuckle joints between the coupling links 30 and 30' and the ends of the leaf spring 40 in similar manner to the pivot blocks of the previous embodiment. The remainder of this modified form of my invention is the same as that heretofore described and the cushioning action obtained is similar although achieved by different means. The transverse compound leaf spring is more suitable for extremely heavy loads than the helical compression spring because of the distribution of shock load over large areas of spring leaves. The compound spring member 40 obviously may flex on either or both sides of the clamp cradle 41, and thus cushion sudden shocks caused by the lifting of either one of the wheels or both wheels together.

Figure 10:
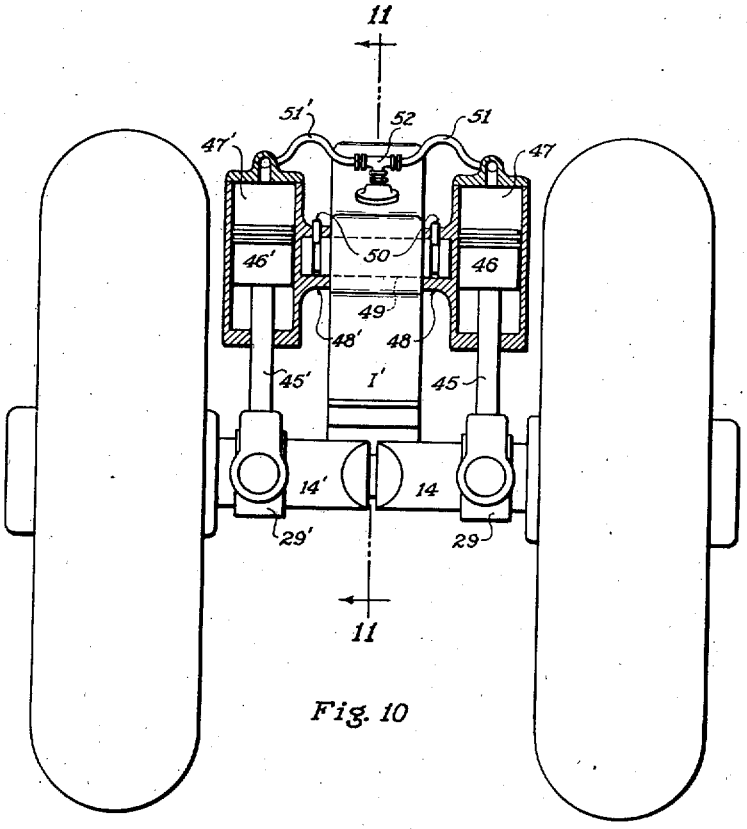
Fig. 10 is an end elevation, partly in vertical section, illustrating a further modification in the means for resiliently connecting the wheel spindle assemblies.
Figure 11:
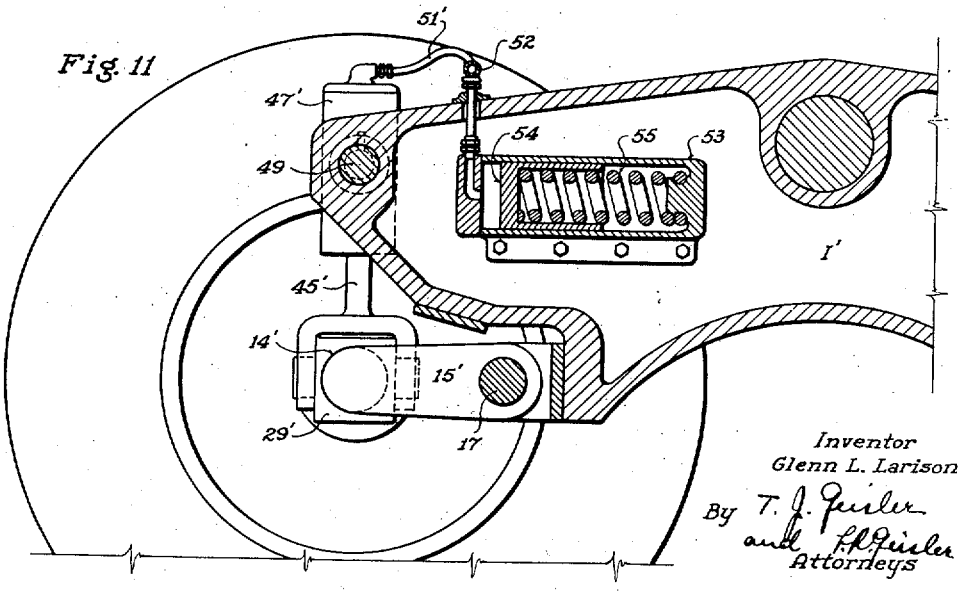
Fig. 11 is a vertical sectional elevation taken on line 11—11 of Fig. 10.

Figures 10 and 11 illustrate another modified form in which my invention may be carried out. In this modified construction, in place of the links 30 and 30', I provided upstanding rods 45 and 45' bifurcated at their lower ends and pivotally mounted to the pivot block 29 and 29', respectively. Pistons 46 and 46' are carried on the upper ends of these rods 45 and 45' and are adapted to reciprocate in the hydraulic cylinders 47 and 47'. In order to compensate for the arcuate movement of the ends of the spindle-arms 14 and 14' the cylinders 47 and 47' are formed with hollow bosses 48 and 48' bored to receive the ends of a shaft 49 extending transversely through the beam I'. Pins 50, firmly secured to the bosses 48 and 48' co-act with grooves in the shaft 49 to hold the cylinders in place and permit slightly arcuate movement in parallel vertical planes.

The space above the pistons 46 and 46' is filled with a suitable fluid such as oil. Flexible tubes 51 and 51' are attached to the cylinders 47 and 47', respectively, which are also filled with the fluid, and these tubes have their other ends connected to a T-fitting 52 which also connects with the spring-loaded hydraulic chamber 53. Normally an upward thrust on the spindle 14, pushing the piston 46 upwardly, will force fluid from cylinder 47 to pass through the tube 51, the T-fitting 52, the tube 51' and into the other cylinder 47' exerting a downward thrust on piston 46'. However, with any sudden upward thrust of piston 46 the fluid from chamber 47 passing through the tube 51 will tend to be forced into the chamber 53 with sufficient impact to cause the piston 54 to compress the spring 55 thus taking up part or all of the thrust of fluid and cushioning the shock as desired. The same result takes place with a sudden upward thrust of the other spindle 14' or with sudden upward thrusts of both spindles simultaneously.

While I have illustrated and described three forms in which my invention may be carried out, it is not my intention to limit my invention to these particular embodiments. Obviously there are other ways in which the desired resilient, spring, or cushioning connection between the two wheel assemblies might be constructed or mounted to carry out the principles of this invention. All that is required is that the two wheel assemblies in each pair be hinged for up and down movement in parallel vertical planes, spaced constantly the same distance apart, and that the two assemblies be connected by suitably resilient means so arranged that a sudden upward thrust of one or both assemblies will be cushioned in the manner described, instead of being transmitted entirely to the other assembly or entirely to the connected portion of the vehicle supporting means.

In this specification the term "vehicle frame" is understood to be that part of the vehicle (composed largely of horizontally extending members) on which the vehicle body, or load carrying bunk, is supported and to which the wheel suspension is connected.

I claim:

1. In a mounting for a pair of vehicle wheels, a vehicle frame, a longitudinal member mounted on said vehicle frame, a pair of wheel-carrying arms, a wheel spindle near the end of each arm, said spindles being substantially perpendicular to the plane of said longitudinal member, and normally in substantially transverse alinement with each other, a hinge connecting each of said arms to said longitudinal member, said hinges having a pivotal axis prependicular to the plane of said longitudinal member, whereby said spindles may be moved up or down with respect to said longitudinal member, but will always be substantially perpendicular to the plane of said longitudinal member and the wheels on said spindles will always be spaced a constant distance from said longitudinal member, compensating linkage joining the spindle-carrying ends of said arms, whereby the vehicle wheels will always carry equal loads, said compensating linkage pivotally mounted on said member, said linkage including resilient means whereby to cushion sudden upward thrusts on either of said arms.

2. A device for mounting a pair of wheels on a vehicle frame, said device including a vertical longitudinal member attached to the vehicle frame, a pair of wheel-carrying assemblies, a wheel spindle in each of said assemblies, said spindles extending in opposite directions from said member and substantially perpendicular to the plane of said member, each of said assemblies hinged to said member for up and down movement, said hinges being perpendicular to the plane of said member, whereby said spindles may be moved up or down with respect to said member but will always be substantially perpendicular to said member and the wheels on said spindles will always be spaced a constant distance from the plane of said member, stops definitely limiting the upward movement of each assembly, linkage connecting said assemblies, said linkage including a pair of rocker arms mounted on said member extending from opposite sides of said member the ends of said rocker arms being connected by links to said assemblies, respectively, each of said rocker arms having an upstanding lug, and a compression spring interposed between said lugs.

3. In a vehicle, a walking beam, a pair of arms, a wheel spindle on each arm, said spindles extending in opposite directions from said walking beam and substantially perpendicular to the plane of said walking beam, each of said arms hinged to said walking beam for up and down movement, said hinges being perpendicular to the plane of said walking beam, whereby said spindles may be moved up or down with respect to said walking beam, but will always be substantially perpendicular to said walking beam and the wheels on said spindles will always be spaced a constant distance from the plane of said walking beam, means definitely limiting the upward movement of each arm, linkage connecting said arms, said linkage pivotally connected to said walking beam, whereby upward movement of one arm will cause a force to be exerted in the opposite direction on the other arm, said linkage including a resilient element whereby to cushion sudden upward thrusts on either of said arms.

4. In a vehicle, a walking beam, a pair of arms, a wheel spindle on each arm, said spindles extending in opposite directions from said walking beam and substantially perpendicular to the plane of said walking beam, each of said arms hinged to said walking beam for up and down movement, said hinges being perpendicular to the plane of said walking beam, whereby said spindles may be moved up or down with respect to said walking beam but will always be substantially perpendicular to said walking beam and the wheels on said spindles will always be spaced a constant distance from the plane of said walking beam, means definitely limiting the upward movement of each arm, means connecting said arms, said connecting means including a pair of rocker arms mounted on said walking beam extending from opposite sides of said walking beam, the ends of said rocker arms being connected by links to said arms, respectively, each of said rocker arms having an uptsanding lug, and a compression spring interposed between said lugs.

5. In a vehicle, a vertical longitudinal member attached to the vehicle frame, a pair of arms, a wheel spindle on each arm, said spindles extending in opposite directions from said member and substantially perpendicular to the plane of said member, each of said arms hinged to said member for up and down movement, said hinges being perpendicular to the plane of said member, whereby said spindles may be moved up or down with respect to said member but will always be substantially perpendicular to said member and the wheels on said spindles will always be spaced a constant distance from the plane of said member, linkage connecting said spindles, whereby upward movement of one spindle will cause a force to be exerted in the opposite direction on the other spindle, said connecting means including a pair of rocker arms mounted on said member extending from opposite sides of said member, the ends of said rocker arms being connected by links to said spindles, respectively, each of said rocker arms having an upstanding lug, and a compression spring interposed between said lugs.

6. A mounting for a pair of wheels including, a walking beam, a pair of wheel spindles, a spindle-carrying means for each spindle hinged to said walking beam, said spindles extending in opposite directions from said walking beam and substantially perpendicular to the plane of said walking beam, means connecting said spindle-carrying means, whereby upward movement of one spindle carrying means will cause a force to be exerted in the opposite direction on the other spindle-carrying means, said connecting means including a pair of rocker arms mounted on said walking beam, extending from opposite sides of said walking beam, the ends of said rocker arms being connected by links to said spindle-carrying means, respectively, each of said rocker arms having an upstanding lug, and a compression spring interposed between said lugs.

7. In a vehicle, a pair of parallel members attached to the vehicle frame, a pair of wheel-carrying assemblies separately hinged to each of said parallel members, a horizontal wheel spindle in each wheel-carrying assembly, the spindles in each pair of assemblies extending in opposite directions, said assemblies hinged to the parallel members to permit up and down movement in parallel planes of the wheels on said spindles, means connecting each pair of said assemblies, said means including a pair of rocker arms pivotally mounted on the member and links connecting said rocker arms and said assemblies, respectively, each rocker arm having an upstanding lug, and a compression spring between the upstanding lugs of each pair of rocker arms.

8. In a vehicle, a pair of walking beams, a pair of wheel-carrying assemblies separately hinged inward from the end of each of said walking beams, a horizontal wheel spindle in each wheel-carrying assembly, the spindles in each pair of assemblies extending in opposite directions, said assemblies hinged to the walking beams to permit up and down movement in parallel planes of the wheels on said spindles, means connecting each pair of said assemblies, said means including a pair of rocker arms pivotally mounted on the walking beam, and links connecting said rocker arms and said assemblies, respectively, each rocker arm having an upstanding lug, and a compression spring between the upstanding lugs of each pair of rocker arms.

9. In a vehicle, a longitudinal member, a pair of wheel-carrying assemblies hinged to said longitudinal member for up and down movement, a wheel spindle in each assembly, said spindles extending in opposite directions, the hinges connecting said assemblies to said longitudinal member being parallel to said spindles, ground engaging members carried by said spindles, means connecting said assemblies, said means so constructed and arranged that upward movement of one assembly will cause a force to be exerted in the opposite direction on the other assembly, and said means including a spring member pivotally connected to said longitudinal member with links connecting said spring member to said assemblies.

10. The combination set forth in claim 9 with said hinges arranged in axial alinement with each other and with said spindles normally in axial alinement with each other.

11. In a vehicle, a mounting for a pair of wheels including a pair of wheel-carrying assemblies, each of said assemblies having a wheel spindle, said spindles extending in opposite directions, each of said assemblies hinged for up and down movement, means connecting said assemblies, said means to constructed and arranged that upward movement of one assembly will cause a force to be exerted in the opposite direction on the other assembly, and said means including hydraulic pistons connected to said assemblies and a spring loaded hydraulic chamber adapted to cushion sudden shocks on either or both of said hydraulic pistons.

12. In a vehicle, a walking beam, a pair of wheel-carrying assemblies hinged near each end of said walking beam for up and down movement in parallel planes, the wheel-carrying assemblies in each pair being connected by a resilient linkage so constructed and arranged that a gradual upward movement of one assembly will produce equal movement in the opposite direction of the other assembly, but the shocks of sudden upward thrusts of one or both assembles will be absorbed in said resilient linkage.

13. In a running gear assembly, a beam member, a plurality of resiliently opposed links pivotally mounted at one end of said beam, links transversely pivoted to said beam at one end and carrying ground engaging means at the other end of said links, and means for securing said first and second named links together so constructed and arranged that said ground engaging means will have movement in planes parallel to said beam and be laterally spaced a constant distance therefrom.

14. The combination set forth in claim 13 with said second named links pivoted to said beam member on a common axis.

15. In a vehicle, a vehicle frame, a mounting for a pair of wheels including a longitudinal member connected to the vehicle frame, a pair of wheel-carrying assemblies, said assemblies extending in the same direction, each of said assemblies including a wheel spindle, said spindles extending in opposite directions, each of said assemblies hinged at one end for up and down movement, the hinges of said assemblies having a pivotal axis substantially parallel to said spindles, thrust linkage connecting the spindle-carrying ends of said assemblies, said thrust linkage so constructed and arranged that upward movement of one assembly will cause a force to be exerted in the opposite direction on the other assembly, whereby the vehicle load on both assemblies will always be equal, and said thrust linkage including a resilient element adapted to cushion the shocks produced by sudden upward thrusts of either or both of said assemblies.

GLENN L. LARISON.